United States Patent
Liao

(10) Patent No.: US 10,678,088 B2
(45) Date of Patent: Jun. 9, 2020

(54) DISPLAY APPARATUS COMPRISING A LENS ASSEMBLY HAVING FIRST AND SECOND LENS LAYERS LOCATED BETWEEN A POLARIZATION CONVERTING UNIT AND A THIRD LENS LAYER AND DISPLAYING METHOD

(71) Applicant: Au Optronics Corporation, Hsinchu (TW)

(72) Inventor: Ren-Wei Liao, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 258 days.

(21) Appl. No.: 15/802,451

(22) Filed: Nov. 3, 2017

(65) Prior Publication Data
US 2019/0049783 A1  Feb. 14, 2019

(30) Foreign Application Priority Data
Aug. 14, 2017  (TW) .............................. 106127403 A

(51) Int. Cl.
| | |
|---|---|
| G02F 1/1335 | (2006.01) |
| G02F 1/03 | (2006.01) |
| G02F 1/1347 | (2006.01) |
| G02B 3/12 | (2006.01) |
| G02F 1/29 | (2006.01) |
| G02B 30/27 | (2020.01) |
| F21V 8/00 | (2006.01) |

(52) U.S. Cl.
CPC ......... *G02F 1/133526* (2013.01); *G02B 3/12* (2013.01); *G02B 6/003* (2013.01); *G02B 30/27* (2020.01); *G02F 1/0311* (2013.01); *G02F 1/13471* (2013.01); *G02F 1/29* (2013.01)

(58) Field of Classification Search
CPC ......... G02B 3/12; G02B 6/003; G02F 1/0311; G02F 1/13471; G02F 2001/291
See application file for complete search history.

(56) References Cited

U.S. PATENT DOCUMENTS

| | | | |
|---|---|---|---|
| 9,104,034 B2 | 8/2015 | Chang | |
| 2012/0162551 A1 | 6/2012 | Sato | |
| 2014/0132863 A1* | 5/2014 | Chang ................ | G02B 27/2214 349/15 |
| 2016/0241843 A1 | 8/2016 | Zhou et al. | |

FOREIGN PATENT DOCUMENTS

| | | |
|---|---|---|
| CN | 103033941 | 4/2013 |
| CN | 105988228 | 10/2016 |
| TW | 201243816 | 11/2012 |
| TW | I472802 | 2/2015 |

\* cited by examiner

*Primary Examiner* — Paul C Lee
(74) *Attorney, Agent, or Firm* — JCIPRNET

(57) ABSTRACT

A display apparatus is provided. The display apparatus includes a display panel, a lens assembly, and a polarization converting unit. The lens assembly includes a first lens layer and a second lens layer. The first lens layer includes a plurality of first lenses. The second lens layer includes a plurality of second lenses. The second lenses are respectively aligned with the first lenses. The polarization converting unit is located between the display panel and the lens assembly. A displaying method is also provided.

13 Claims, 13 Drawing Sheets

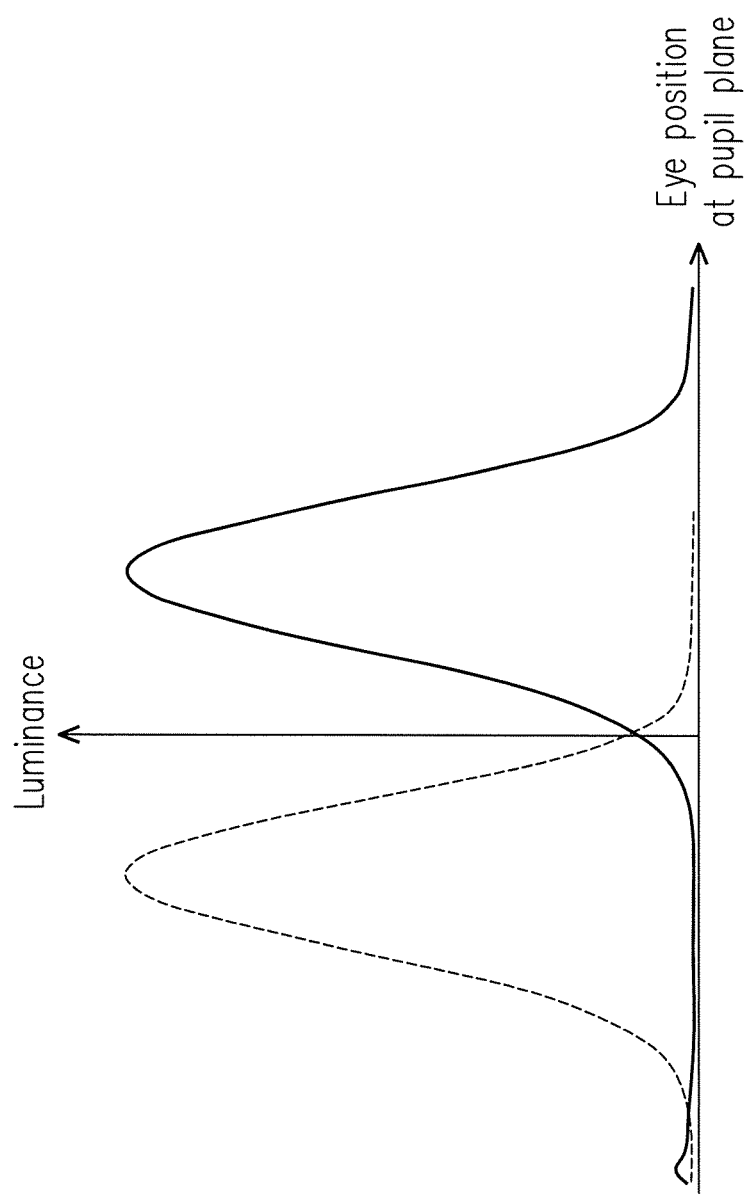

DISPLAY APPARATUS COMPRISING A LENS ASSEMBLY HAVING FIRST AND SECOND LENS LAYERS LOCATED BETWEEN A POLARIZATION CONVERTING UNIT AND A THIRD LENS LAYER AND DISPLAYING METHOD

CROSS-REFERENCE TO RELATED APPLICATION

This application claims the priority benefit of Taiwan application serial no. 106127403, filed on Aug. 14, 2017. The entirety of the above-mentioned patent application is hereby incorporated by reference herein and made a part of this specification.

BACKGROUND OF THE INVENTION

1. Field of the Invention

The present invention generally relates to a display apparatus.

2. Description of Related Art

Head-mount Display (HMD) is a display that can be worn on a body. The HMD is a small display in which a lens assembly is positioned at a location close to the viewer's eyes for the viewer to view the image, thereby yielding similar effect as viewing from large display far away from the viewer. In general, close-to-eye display only has one virtual image plane. Due to the position differences in convergence and accommodation of the viewer's eyes, close-to-eye display would cause the viewer to feel uncomfortable during viewing. In order to resolve the foregoing problem, some HMD utilizes the concept of spatial light splitting to generate multiple view points on the pupil plane, so as to adjust the positions of the convergence and accommodation of the viewer's eyes. Nevertheless, if too many view points are generated, the resolution would decrease and the display quality of the HMD would be affected.

SUMMARY OF THE INVENTION

An embodiment of the present invention provides a display apparatus which may effectively enhance the resolution.

An embodiment of the present invention provides a displaying method which may effectively enhance the resolution.

An embodiment of the present invention provides a display apparatus including a display panel, a lens assembly, and a polarized converting unit. The lens assembly includes a first lens layer and a second lens layer. The first lens layer includes a plurality of first lenses. The second lens layer includes a plurality of second lenses respectively aligned with the first lenses. The polarization converting unit is located between the display panel and the lens assembly.

An embodiment of the present invention provides a displaying method at least including the following steps. A plurality of first polarized image beams is provided during a first time period to generate a first view point set. The first view point set includes a plurality of first view points. A plurality of second polarized image beams is provided during a second time period to generate a second view point set. The second view point set includes a plurality of second view points. At least one first view point of the first view point set is inserted among the second view points of the second view point set.

An embodiment of the present invention provides a displaying method at least including the following steps. First, a display apparatus is provided. The display apparatus includes a display panel, a lens assembly, and a polarization converting unit. The lens assembly includes a first lens layer and a second lens layer. The first lens layer includes a plurality of first lenses. The second lens layer includes a plurality of second lens respectively aligned with the first lenses. The polarization converting unit is located between the display panel and the lens assembly. A plurality of first polarized image beams is provided during a first time period through the second lens layer to generate a first view point set. The first view point set includes a plurality of first view points. A plurality of second polarized image beams is provided during a second time period through the first lens layer to generate a second view point set. The second view point set includes a plurality of second view points. At least one first view point of the first view point set is inserted among the second view points of the second view point set.

Based on the above, the display apparatus of an embodiment of the present invention utilizes the concept of spatial light splitting and the concept of time light splitting to generate multiple view points on the pupil plane. As a result, high resolution image may be provided to the viewer under a comfortable viewing environment.

In order to make the aforementioned and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4B is a diagram illustrating luminance-eye position at pupil plane curve of the display panel during the first time period according to an embodiment of the present invention.

DESCRIPTION OF THE EMBODIMENTS

Figure 1:
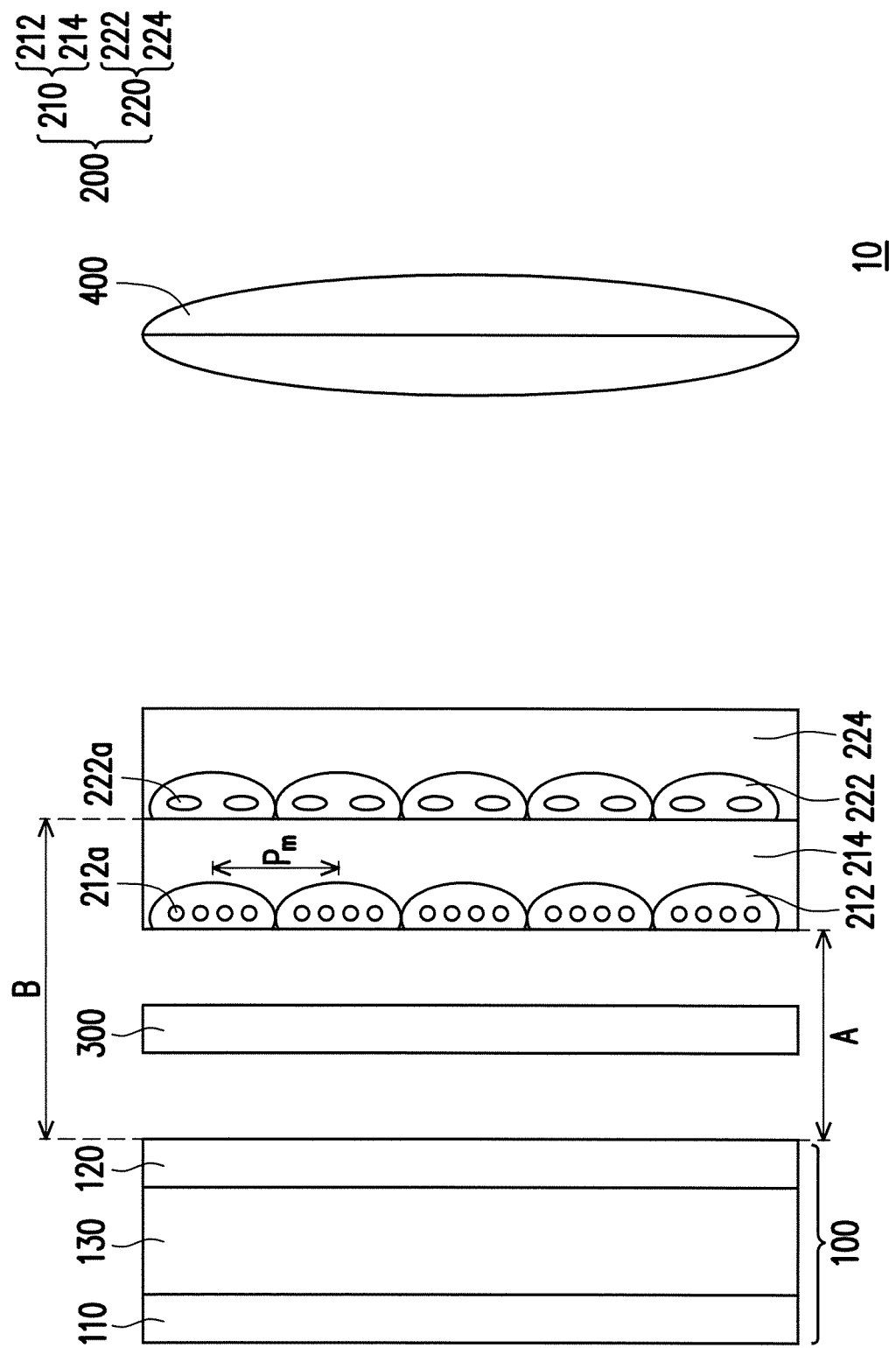
FIG. 1 is a schematic view of a display apparatus according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view of a display apparatus 10 according to an embodiment of the present invention. Referring to FIG. 1, the display apparatus 10 includes a display panel 100, a lens assembly 200, a polarization converting unit 300, and a third lens layer 400. The display panel 100 includes an active device array substrate 110, an opposite substrate 120, and a liquid crystal layer 130. The liquid crystal layer 130 is sandwiched between the active device array substrate 110 and the opposite substrate 120.

Figure 2:
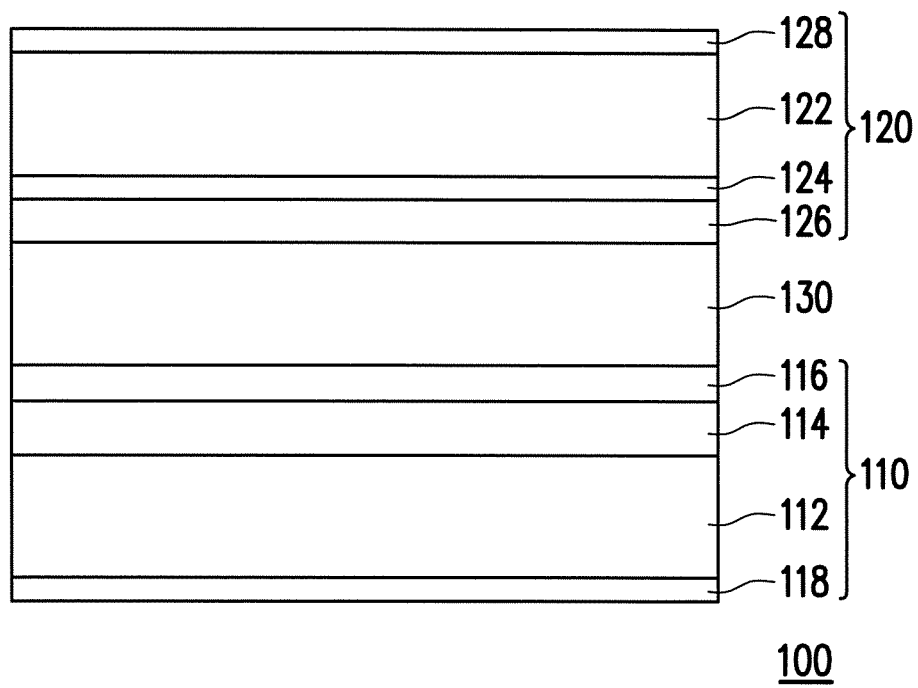
FIG. 2 is a schematic cross-sectional view of a display panel of the display apparatus in FIG. 1.

FIG. 2 is a schematic cross-sectional view of the display panel 100 of the display apparatus 10 in FIG. 1. The detailed descriptions with respect to the display panel 100 will be provided below. Referring to FIG. 2, the active device array substrate 110 includes a first substrate 112, an active device array layer 114, a first alignment layer 116, and a first polarizer 118. A material of the first substrate 100 includes glass, quartz, organic polymer, metal, or the like. The active device array layer 114 is disposed on the first substrate 112, and the descriptions with respect to the active device array layer 114 will be discussed in greater detail later. The first alignment layer 116 is disposed on the active device array layer 114 to provide alignment function to the liquid crystal layer 130. The first polarizer 118 is disposed on a surface of the first substrate 112 opposite to the active device array layer 114 to modulate the polarization direction of a light beam.

The opposite substrate 120 includes a second substrate 122, an opposite electrode 124, a second alignment layer 126, and a second polarizer 128. A material of the second substrate 122 includes glass, quartz, organic polymer, metal, or the like. When the material of the first substrate 112 is not metal, the material of the second substrate 122 may be the same or different from the material of the first substrate 112. Moreover, in order for the display panel 100 to exhibit a colourful display effect, the first substrate 112 or the second substrate 122 may include a color filter layer (not shown), which includes red, green, and blue color filter patterns. Namely, the second substrate 122 may be a color filter substrate or the first substrate 112 may adapt the design of Color filter on Array (COA) or Array on Color filter (AOC). In addition, the display panel 100 may further include a shielding pattern layer (also referred to as "black matrix"; not shown) disposed on the second substrate 122 or the first substrate 112 and disposed between color filter patterns of the color filter array.

The opposite electrode layer 124 is disposed on the second substrate 122. The opposite electrode layer 124 is located between the liquid crystal layer 130 and the second substrate 122. The opposite electrode layer 124 may be a transparent conductive layer, and a material thereof includes metal oxides, such as indium tin oxide (ITO) or indium zinc oxide (IZO). The opposite electrode layer 124 may be disposed on the second substrate 122 in a fully covered manner or a patterned manner. In some embodiments, the opposite electrode layer 124 is coupled to a common voltage (Vcom). When a voltage different from the common voltage is applied to the active device array layer 114, a vertical electrical field is generated between the active device array layer 114 and the opposite electrode layer 124 to drive the liquid molecules in the liquid crystal layer 130 between the active device array layer 114 and the opposite electrode layer 124. The second alignment layer 126 is disposed on the opposite electrode layer 124 to provide alignment function to the liquid crystal layer 130. A material of the first alignment layer 116 and the second alignment layer 126 includes organic materials. The second polarizer 128 is disposed on a surface of the second substrate 122 opposite to the opposite electrode layer 124 to modulate the polarization direction of a light beam. It should be noted that in some embodiments, the first polarizer 118 and/or the second polarizer 128 may be omitted, and the present invention is not limited thereto.

The liquid crystal layer 130 is located between the first alignment layer 116 and the second alignment layer 126. The liquid crystal layer 130 includes liquid crystal molecules. In some embodiments, a Polymer-Stabilized Alignment (PSA) technique may be adapted. Therefore, other than the liquid crystal molecules, the liquid crystal layer 130 also includes monomers. In other words, prior to an irradiation process for the monomer, the liquid crystal layer 130 contains liquid crystal molecules and monomers. When the irradiation process for the monomer is performed on the display panel, the monomers undergoes polymerization reaction to form a polymeric thin film on a surface of the active device array layer 114. Therefore, after the irradiation process of the monomer is performed on the display panel, the liquid crystal layer 130 is mainly constituted by liquid crystal molecules.

Figure 3:
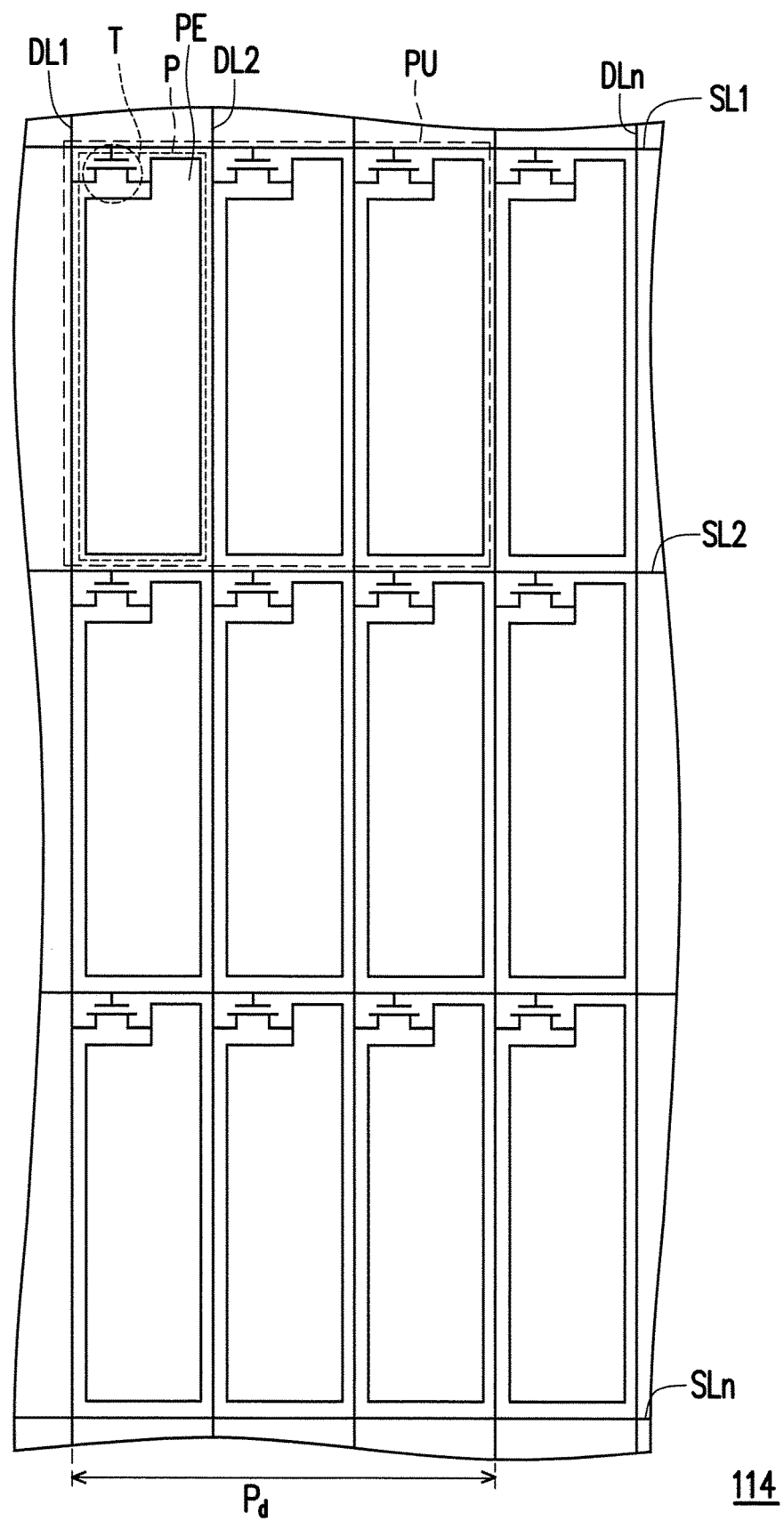
FIG. 3 is a schematic top view of an active device layer of the display panel in FIG. 2.

FIG. 3 is a schematic top view of the active device layer 114 of the display panel 100 in FIG. 2. The detailed descriptions with respect to the active device layer 114 will be provided below. Referring to FIG. 3, the active device array layer 114 includes a plurality of scan line SL1-SLn, a plurality of data lines DL1-DLn, and a plurality of pixel structures P. The scan lines SL1-SLn and the data lines DL1-DLn are arranged in an interlaced manner. Each pixel structure P is electrically connected to one of the corresponding scan lines SL1-SLn and one of the corresponding data lines DL1-DLn. In the present embodiment, the scan lines SL1-SLn and the data lines DL1-DLn are disposed in the interlaced manner to form the pixel structures P, but the present invention is not limited thereto. In some embodiments, an extending direction of the scan lines SL1-SLn and an extending direction of the data lines DL1-DLn are not parallel. Preferably, the extending direction of the scan lines SL1-SLn is perpendicular to the extending direction of the data lines DL1-DLn. When taken conductivity into considerations, an insulation layer is sandwiched between the scan lines SL1-SLn and the data lines DL1-DLn. In general, a material of the scan lines SL1-SLn and the data lines DL1-DLn includes metallic materials, but the present invention is not limited thereto. According to other embodiments, the scan lines SL1-SLn and the data lines DL1-DLn may utilize other conductive materials, such as alloys, nitrides of metallic material, oxides of metallic material, oxynitrides of metallic material, other suitable materials, or a stacked layer of metallic material and other conductive materials.

Each pixel structure P includes an active device T and a pixel electrode PE. Referring to FIG. 3, the active device T is electrically connected to the corresponding scan line (exemplified as the scan line SL1) and the corresponding data line (exemplified as the data line DL1). On the other hand, the pixel electrode PE is electrically connected to the active device T. The active device T includes a gate electrode (not shown), a channel layer (not shown), a source electrode (not shown), and a drain electrode (not shown). The mechanisms of the active device T and the pixel electrode PE are known to a person having ordinary skill in the art, so the detailed descriptions thereof are omitted herein. In the present embodiment, three pixels P together may be considered as a pixel unit PU, and each pixel unit PU has a width $P_d$. However, the present invention is not limited thereto. In other embodiments, the pixel unit PU may be constituted by other number of pixel structures P. It should be noted that in the present embodiment, a liquid crystal display panel is exemplified as the display panel 100, but the present invention is not limited thereto. In other embodiments, the display panel 100 may be an Organic Light-Emitting Diode (OLED) display panel or an electrowetting display panel. When adapting the OLED display panel or the electrowetting display panel, a polarizer is required to be used in conjunction with the display panel to allow the light beam to have a polarization direction.

In general, the liquid crystal molecules have an anisotropic refractive index. Namely, when the light enters the liquid crystal molecules, if an oscillating direction of an electric field of the light is perpendicular to a major axis direction of the liquid crystal molecules, the light is called ordinary ray. If the oscillating direction of the electric field of the light is parallel to the major axis direction of the liquid crystal molecules, the light is called extraordinary ray. An ordinary light refractive index ($n_o$) and an extraordinary light refractive index ($n_e$) are respectively the refractive index of the liquid crystal molecules relative to the ordinary ray and the extraordinary ray. Referring to FIG. 1 again, the lens assembly 200 is disposed on the right hand side of the display panel 100 and includes a first lens layer 210 and a second lens layer 220. The first lens layer 210 is disposed adjacent to the second lens layer 220. The first lens layer 210 and the second lens layer 220 may be direct in contact with each other or may be separated from each other. The first lens layer 210 includes a first covering layer 214 and a plurality of first lenses 212 parallel with and adjacent to each other. The first lenses 212 may be formed by recessing a portion of the first covering layer 214 off and filling first liquid crystal molecules 212a into the recess of the first covering layer 214. In some embodiments, a material of the first covering layer 214 is, for example, epoxy resin, UV glue, or other suitable materials. In the present embodiment, a refractive index of the first covering layer 214 may approximately equal to the ordinary light refractive index of the first liquid crystal molecules 212a. Moreover, the first liquid crystal molecules 212a filled into the first lens 212 has a first orientation. The second lens layer 220 includes a second covering layer 224 and a plurality of second lenses 222 parallel with and adjacent to each other. The second lenses 222 may be formed by recessing a portion of the second covering layer 224 off and filling second liquid crystal molecules 222a into the recess of the second covering layer 224. In the present embodiment, a refractive index of the second covering layer 224 may approximately equal to the ordinary light refractive index of the second liquid crystal molecules 222a. In some embodiments, a material of the second covering layer 224 may be similar to the material of the first covering layer 214. Moreover, the second liquid crystal molecules 222a filled into the second lens 222 has a second orientation, and the second orientation is perpendicular to the first orientation. In other words, the orientation of the first liquid crystal molecules 212a in the first lenses 212 and the orientation of the second liquid crystal molecules 222a in the second lenses 222 are perpendicular to each other.

As illustrated in FIG. 1, the second lenses 222 are respectively aligned with the first lenses 212. In other words, an edge of each of the second lenses 222 is aligned with an edge of the corresponding first lens 212, and a vertical projection of each second lens 222 onto the position where the first lenses 212 are located is completely overlapped with the corresponding first lens 212. Moreover, a pitch $P_m$ is between centers of two adjacent first lenses 212. The width $P_d$ of the pixel unit PU in the display panel 100 is greater than the pitch $P_m$ between first lenses 212. As mentioned above, since the second lenses 222 are respectively aligned with the first lenses 212, the pitch $P_m$ between centers of two adjacent second lenses 222 is the same as the pitch $P_m$ between centers of two adjacent first lenses 212. In the present embodiment, the first lens layer 210 is located between the display panel 100 and the second lens layer 220. A first distance A is between the display panel 100 and the first lens layer 210, and a second distance B is between the display panel 100 and the second lens layer 220. During operation of the display apparatus 10, based on a relationship between the first distance A and the second distance B, N view points may be generated (the mechanism for generating view points will be discussed in greater detail later). The relationship may be defined by the following equation:

$$B = A \times \left(\frac{N+1}{N-1}\right).$$

Referring to FIG. 1, the polarization converting unit 300 is disposed between the display panel 100 and the lens assembly 200. In the present embodiment, the polarization converting unit 300 is a Twisted Nematic Liquid Crystal (TN-LC) cell. In other words, the polarization converting unit 300 includes two substrates (not shown) and a liquid crystal layer (not shown) disposed between the substrates. An electrode layer (not shown) may be disposed on the substrates to generate an electrical field which may alter the orientation of the liquid crystal molecules, thereby allowing the polarization converting unit 300 to modulate the polarization direction of an incident light. However, the disclosure is not limited thereto. In other embodiments, the polarization converting unit 300 may be a Fringe Field Switching Liquid Crystal (FFS-LC) cell, an Optically Compensated Birefringence Liquid Crystal (OBC-LC) cell, or a Polymer Sustained Alignment Liquid Crystal (PSA-LC) cell.

Referring to FIG. 1, the display apparatus 10 further includes the third lens layer 400 disposed on the right hand side of the lens assembly 200 to converge the light beams emitted from the lens assembly 200 to specific view points.

Figure 4A:
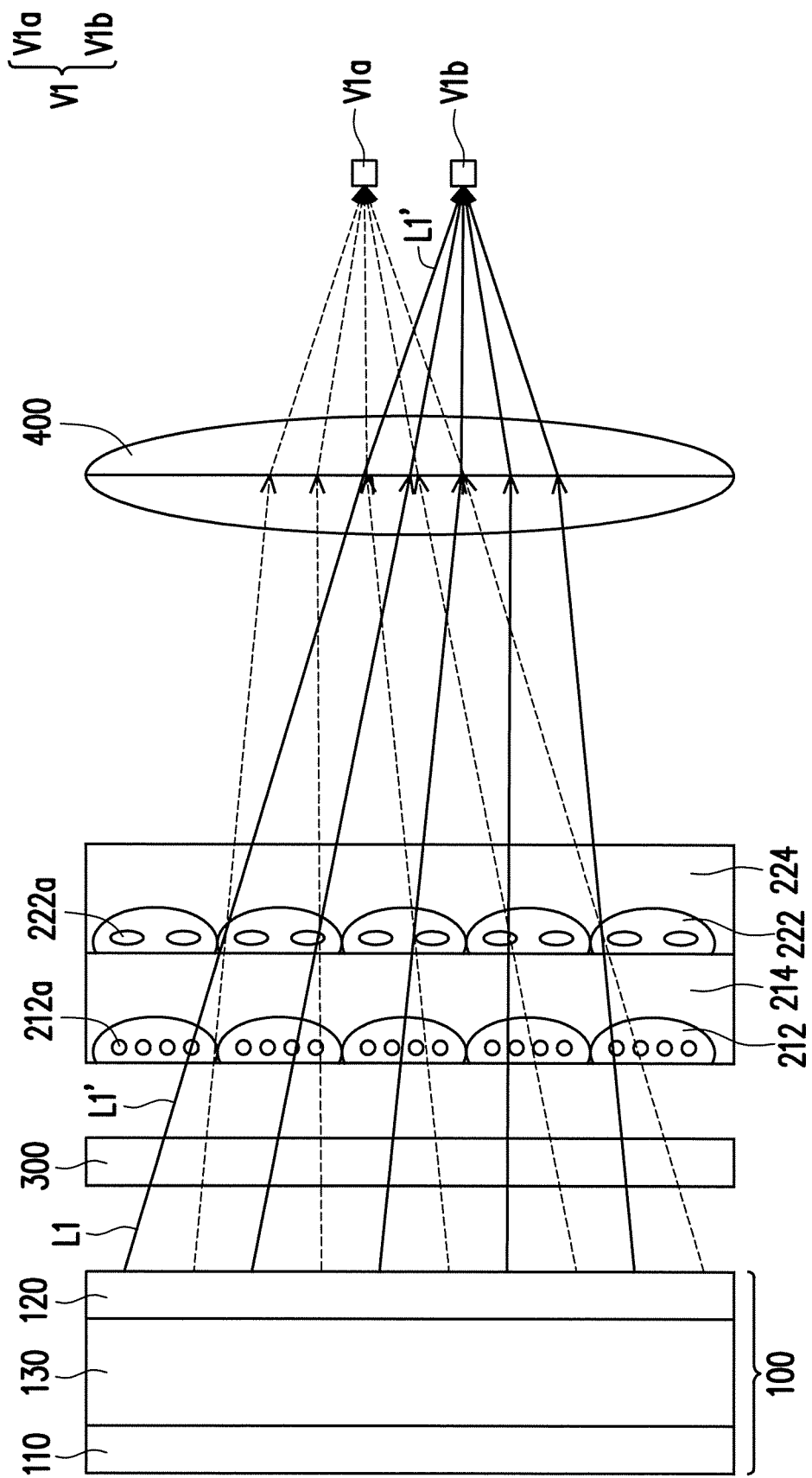
FIG. 4A is a schematic view illustrating the trajectory of light beams of a display panel during a first time period according to an embodiment of the present invention.
Figure 4C:
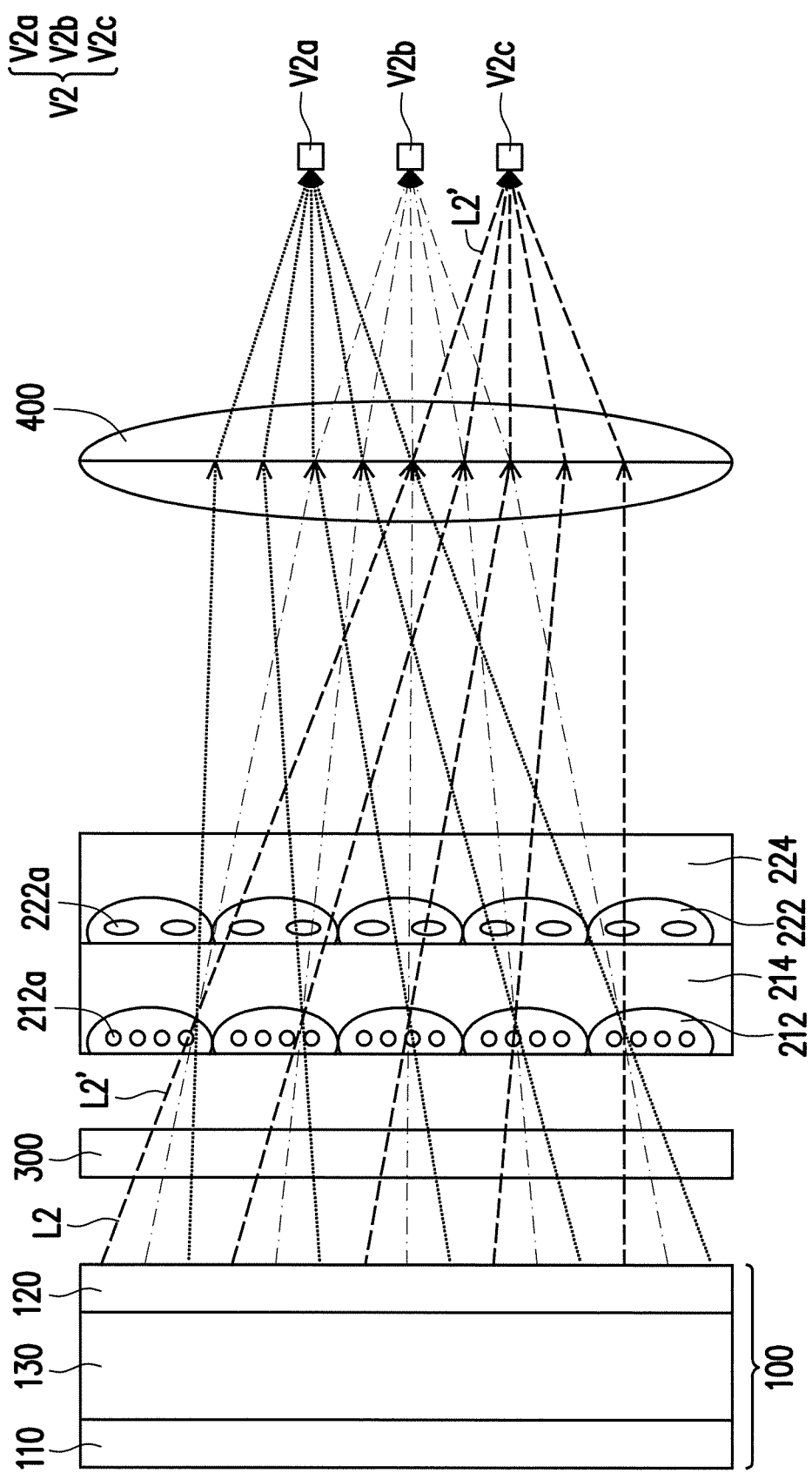
FIG. 4C is a schematic view illustrating the trajectory of light beams of the display panel during a second time period according to an embodiment of the present invention.
Figure 4D:
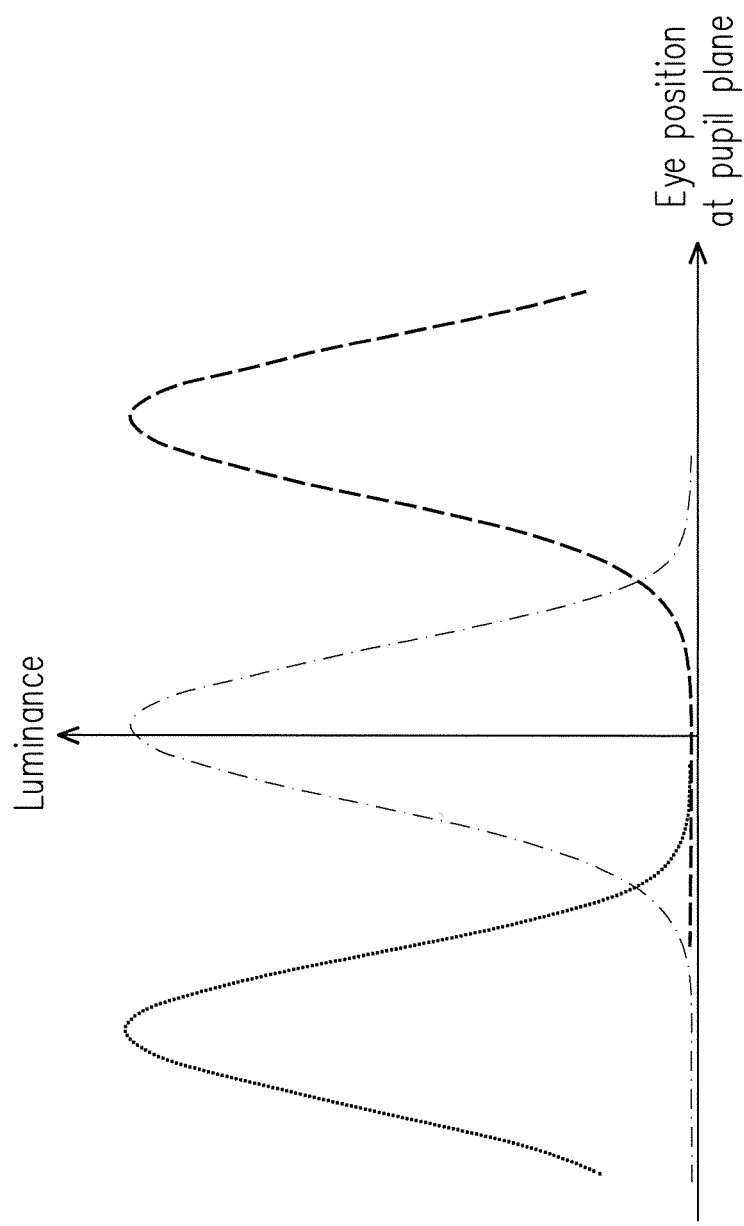
FIG. 4D is a diagram illustrating luminance-eye position at pupil plane curve of the display panel during the second time period according to an embodiment of the present invention.
Figure 4E:
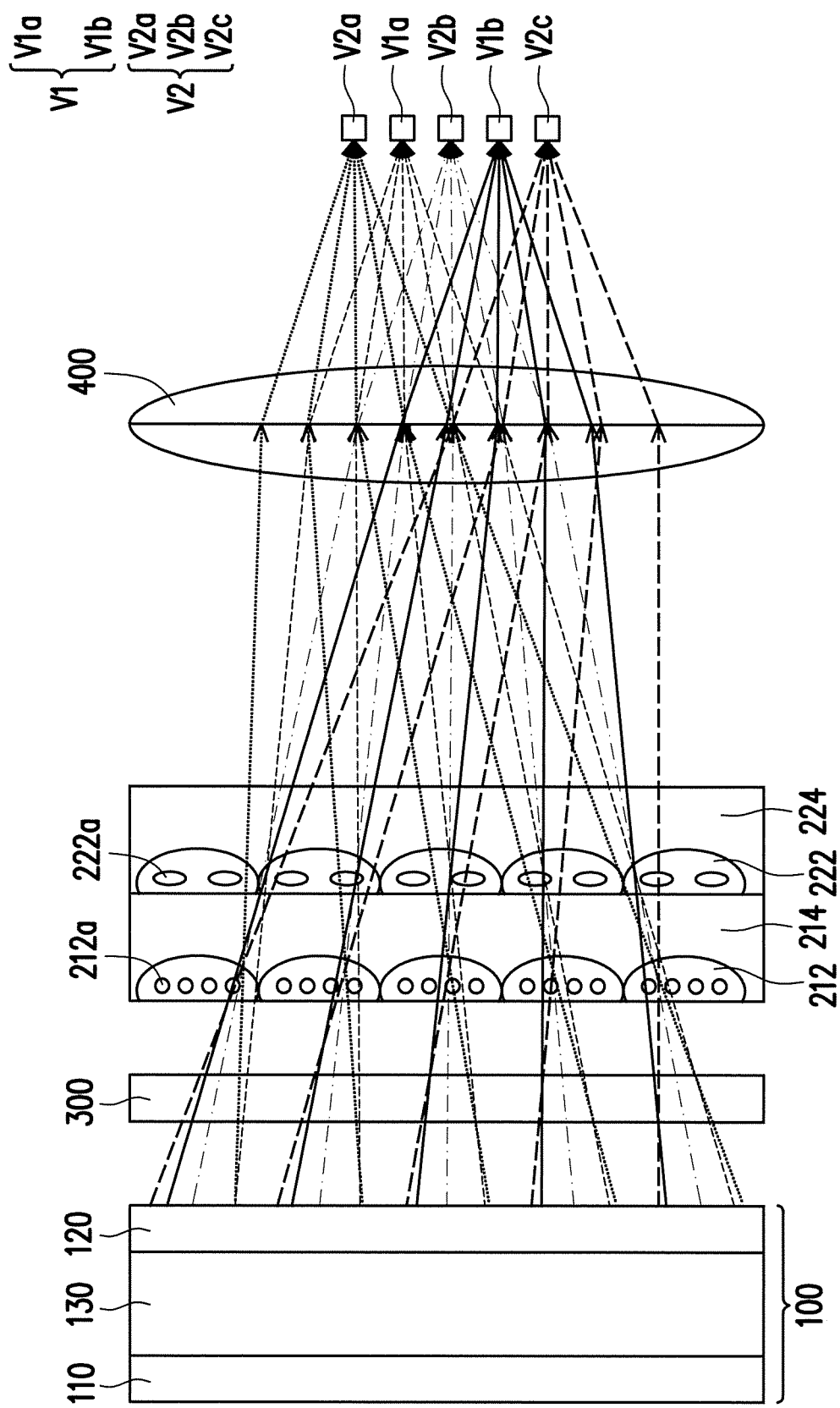
FIG. 4E is a schematic view illustrating the trajectory of light beams of the display panel according to an embodiment of the present invention.
Figure 4F:
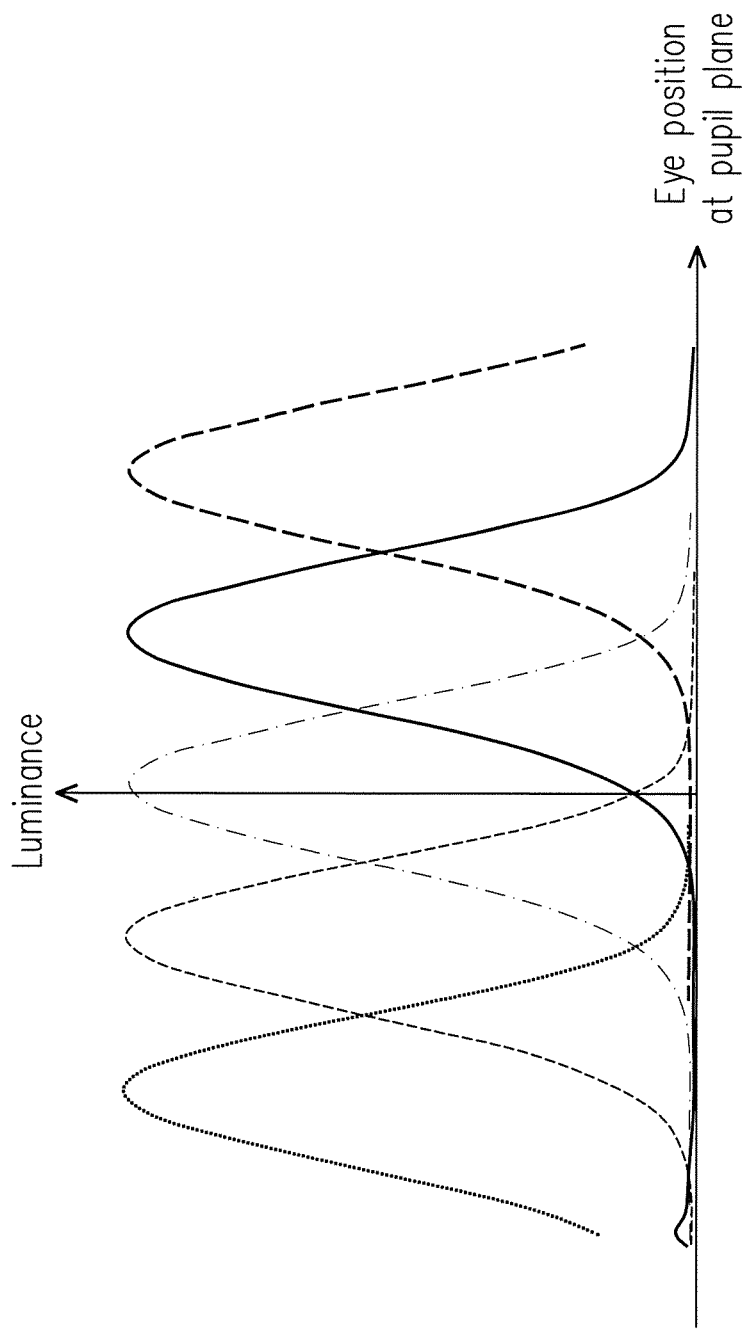
FIG. 4F is a diagram illustrating luminance-eye position at pupil plane curve of the display panel according to an embodiment of the present invention.

FIG. 4A is a schematic view illustrating the trajectory of light beams of a display panel 10 during a first time period according to an embodiment of the present invention. FIG. 4B is a diagram illustrating luminance-eye position at pupil plane curve of the display panel 10 during the first time period according to an embodiment of the present invention. FIG. 4C is a schematic view illustrating the trajectory of light beams of a display panel 10 during a second time period according to an embodiment of the present invention. FIG. 4D is a diagram illustrating luminance-eye position at pupil plane curve of the display panel 10 during the second time period according to an embodiment of the present invention. FIG. 4E is a schematic view illustrating the trajectory of light beams of the display panel 10 according to an embodiment of the present invention. FIG. 4F is a diagram illustrating luminance-eye position at pupil plane curve of the display panel 10 according to an embodiment of the present invention. The displaying method of the display apparatus 10 will be described in greater detail below.

Referring to FIG. 4A and FIG. 4B, during the first time period, a plurality of first image beams L1 is provided through the display panel 100. When the first image beams L1 pass through the polarization converting unit 300, the polarization converting unit 300 modulates the first image beams L1 into first polarized image beams L1' having a polarization direction. The polarization direction of the first polarized image beams L1' is parallel to the minor axis of the first liquid crystal molecules 212a in the first lenses 212. Therefore, when the first polarized image beams L1' pass through the first lens layer 210, the first polarized image beams L1' are not refracted at an interface between the first covering layer 214 and the first lenses 212, thereby entering the second lens layer 220 with the original propagation direction. The polarization direction of the first polarized image beams L1' is parallel to the major axis of the second liquid crystal molecules 222a in the second lenses 222. Therefore, when the first polarized image beams L1' pass through the second lens layer 220, the first polarized image beams L1' are refracted at an interface between the second covering layer 224 and the second lenses 222, thereby allowing the first polarized image beams L1' to change propagation direction before entering the third lens layer 400. After the first polarized image beams L1' pass through the third lens layer 400, the first polarized image beams L1' are converged to specific locations to generate a first view point set V1. The location and the number of the first view point set V1 may be determined by measuring the luminance at each position. A first measured wave group having k1 significant wave peaks may be obtained during the first time period, and the number of the first view point set V1 may be determined by the number of the significant wave peaks. For example, referring to FIG. 4B, the first measured wave group includes two significant wave peaks. Therefore, the first view point set V1 includes two first view points V1a and V1b.

Next, referring to FIG. 4C and FIG. 4D, during the second time period, a plurality of second image beams L2 is provided through the display panel 100, and the second image beams L2 are different from the first image beams L1. When the second image beams L2 pass through the polarization converting unit 300, the polarization converting unit 300 modulates the second image beams L2 into second polarized image beams L2' having a polarization direction. The polarization direction of the second polarized image beams L2' is parallel to the major axis of the first liquid crystal molecules 212a in the first lenses 212. Therefore, when the second polarized image beams L2' pass through the first lens layer 210, the second polarized image beams L2' are refracted at an interface between the first covering layer 214 and the first lenses 212, thereby allowing the second polarized image beams L2' to change propagation direction before entering the second lens layer 220. The polarization direction of the second polarized image beams L2' is parallel to the minor axis of the second liquid crystal molecules 222a in the second lenses 222. Therefore, when the second polarized image beams L2' pass through the second lens layer 220, the second polarized image beams L2' are not refracted at an interface between the second covering layer 224 and the second lens layer 222, thereby entering the third lens layer 400 with the original propagation direction. After the second polarized image beams L2' pass through the third lens layer 400, the second polarized image beams L2' are converged to specific locations to generate a second view point set V2. Similar to the first view point set V1, the location and the number of the second view point set V2 may also be determined by measuring the luminance at each position. A second measured wave group having k2 significant wave peaks may be obtained during the second time period, and the number of the second view point set V2 may be determined by the number of the significant wave peaks. For example, referring to FIG. 4D, the second measured wave group includes three significant wave peaks. Therefore, the second view point set V2 includes three second view points V2a, V2b, and V2c.

Referring to FIG. 4E and FIG. 4F, when combining the image transmission of the first time period and the second time period, N view points may be obtained. For example, N=k1+k2, and N is a positive odd number. In the present embodiment, a sum of the first view point set V1 and the second view point set V2 is 5. In other words, in the present embodiment, the display apparatus 10 is able to generate 5 view points. As mentioned above, the relationship among the number of the view points generated by the display apparatus 10, the first distance A, and the second distance B is defined by the following equation:

$$B = A \times \left(\frac{N+1}{N-1}\right).$$

In the present embodiment, the second distance B between the display panel 100 and the second lens layer 220 is 1.5 times the first distance A between the display panel 100 and the first lens layer 210. Moreover, referring to FIG. 4E, in the present embodiment, the first view point V1a is located between the second view points V2a, V2b and the first view point V1b is located between the second view points V2b, V2c. In other words, in the present embodiment, the first view points V1a, V1b and the second view points V2a, V2b, V2c are arranged alternately.

Based on the foregoing, the display apparatus 10 utilizes the concept of spatial light splitting and the concept of time light splitting to generate first view point set V1 and the second view point set V2 arranged alternately on the pupil plane. As a result, high resolution image may be provided to the viewer under a comfortable viewing environment.

Figure 5:
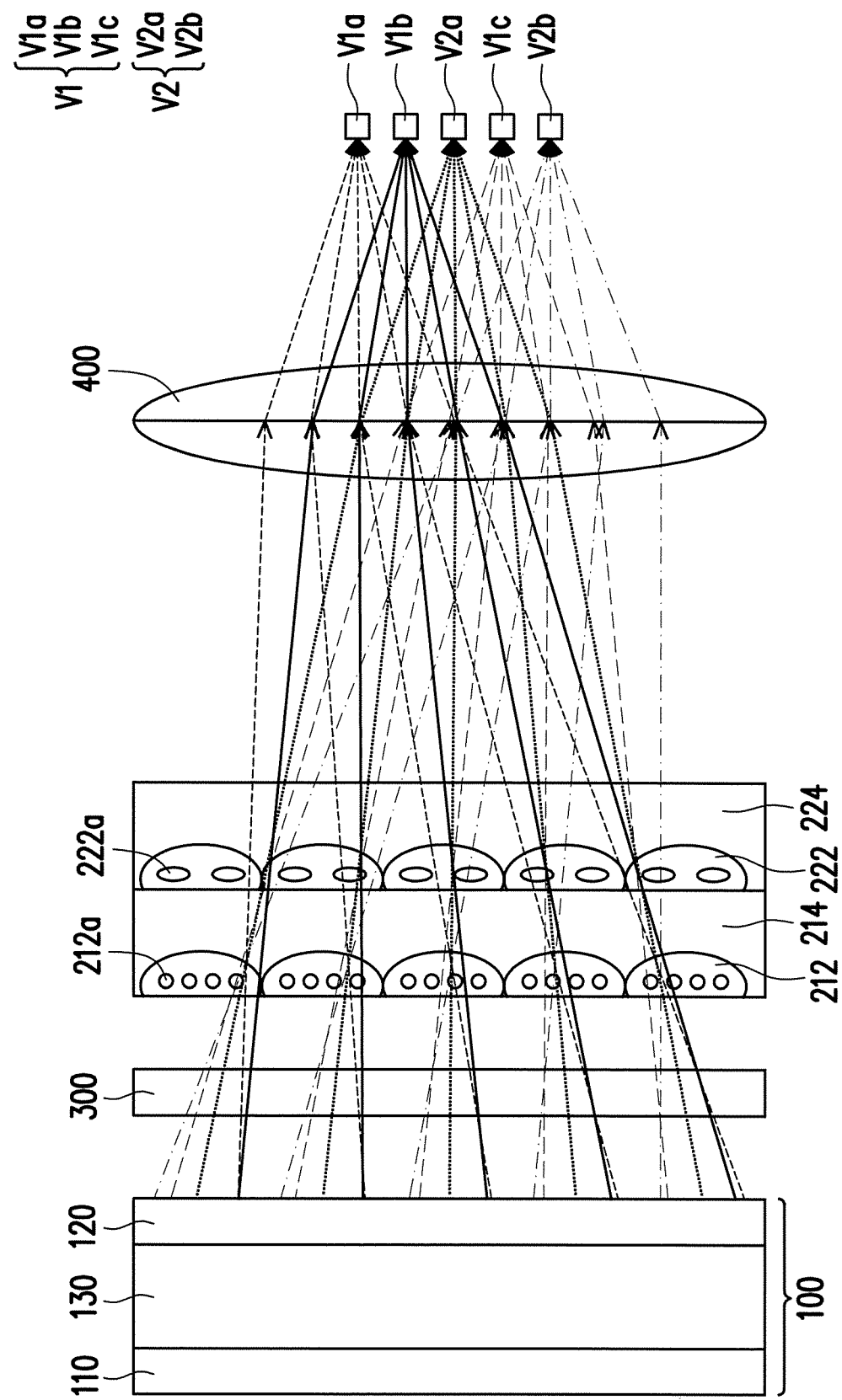
FIG. 5 is a schematic view illustrating the trajectory of light beams of a display panel according to another embodiment of the present invention.

FIG. 5 is a schematic view illustrating the trajectory of light beams of a display panel 10 according to another embodiment of the present invention. The present embodiment is similar to the embodiment of FIG. 4E, so the same elements are denoted by the same reference numerals and the detailed descriptions thereof are omitted herein. The difference between the embodiments of FIG. 5 and FIG. 4E lies in the number and the locations of the first view point set V1 and the second view point set V2 respectively generated during the first time period and the second time period. Referring to FIG. 5, in the present embodiment, the first view point set V1 includes three first view points V1a, V1b, V1c and the second view point set V2 includes two second view points V2a, V2b. Moreover, these view points are arranged in the order of the first view point V1a, the first view point V1b, the second view point V2a, the first view point V1c, and the second view point V2b. At least one of the first view points V1a, V1b, V1c of the first view point set V1 is inserted between the second view points V2a, V2b of the second view point set V2. In other words, other than arranging in an alternating manner as depicted in the embodiment of FIG. 4E, the view points may also arrange in a random manner as long as at least one of the first points V1a, V1b, V1c of the first view point set V1 is inserted between the second view points V2a, V2b of the second view point set V2.

Based on the foregoing, the display apparatus 10 utilizes the concept of spatial light splitting and the concept of time light splitting to generate first view point set V1 and the second view point set V2 arranged randomly on the pupil plane. As a result, high resolution image may be provided to the viewer under a comfortable viewing environment.

Figure 6A:
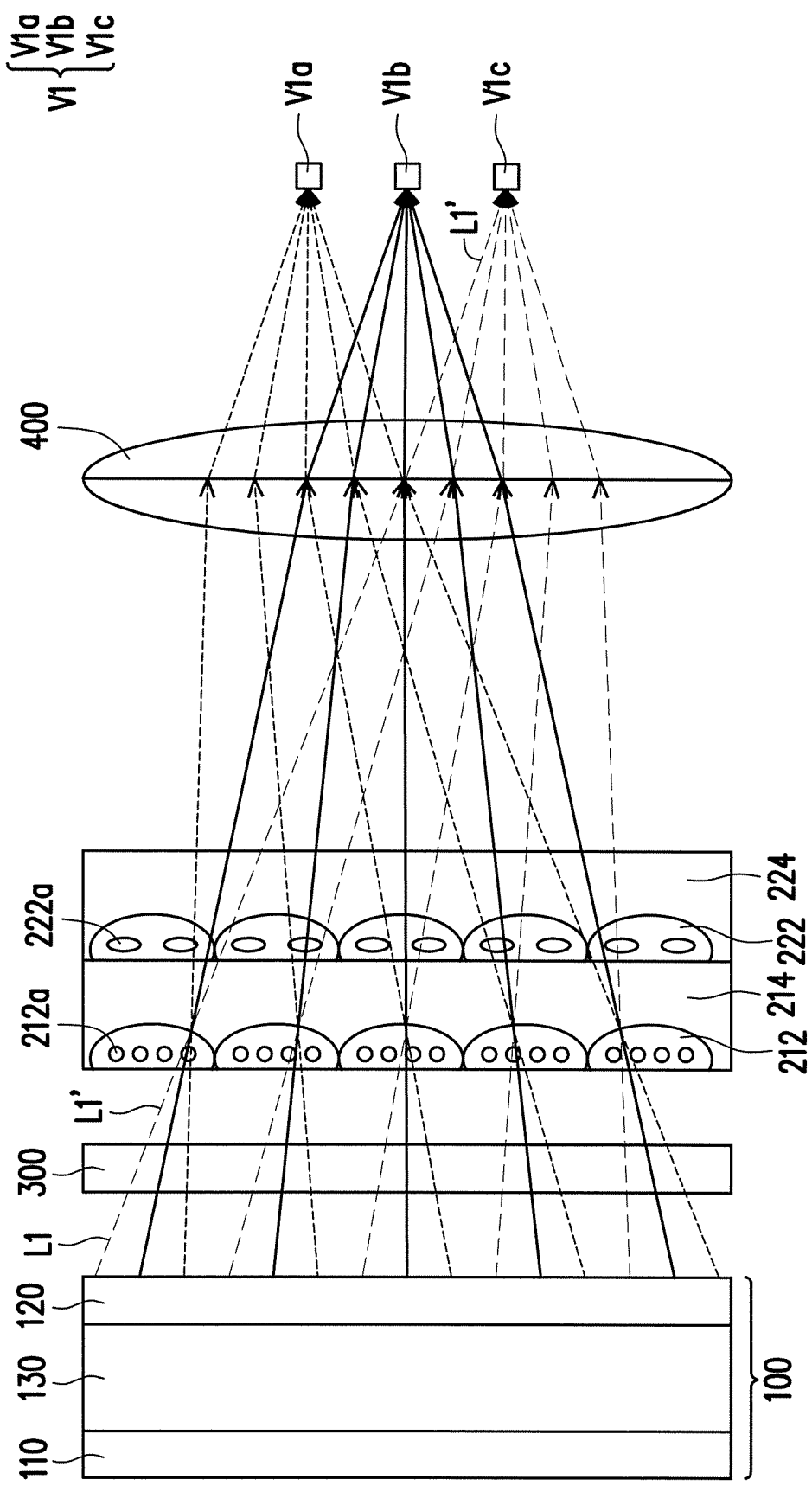
FIG. 6A is a schematic view illustrating the trajectory of light beams of a display panel during a first time period according to yet another embodiment of the present invention.
Figure 6B:
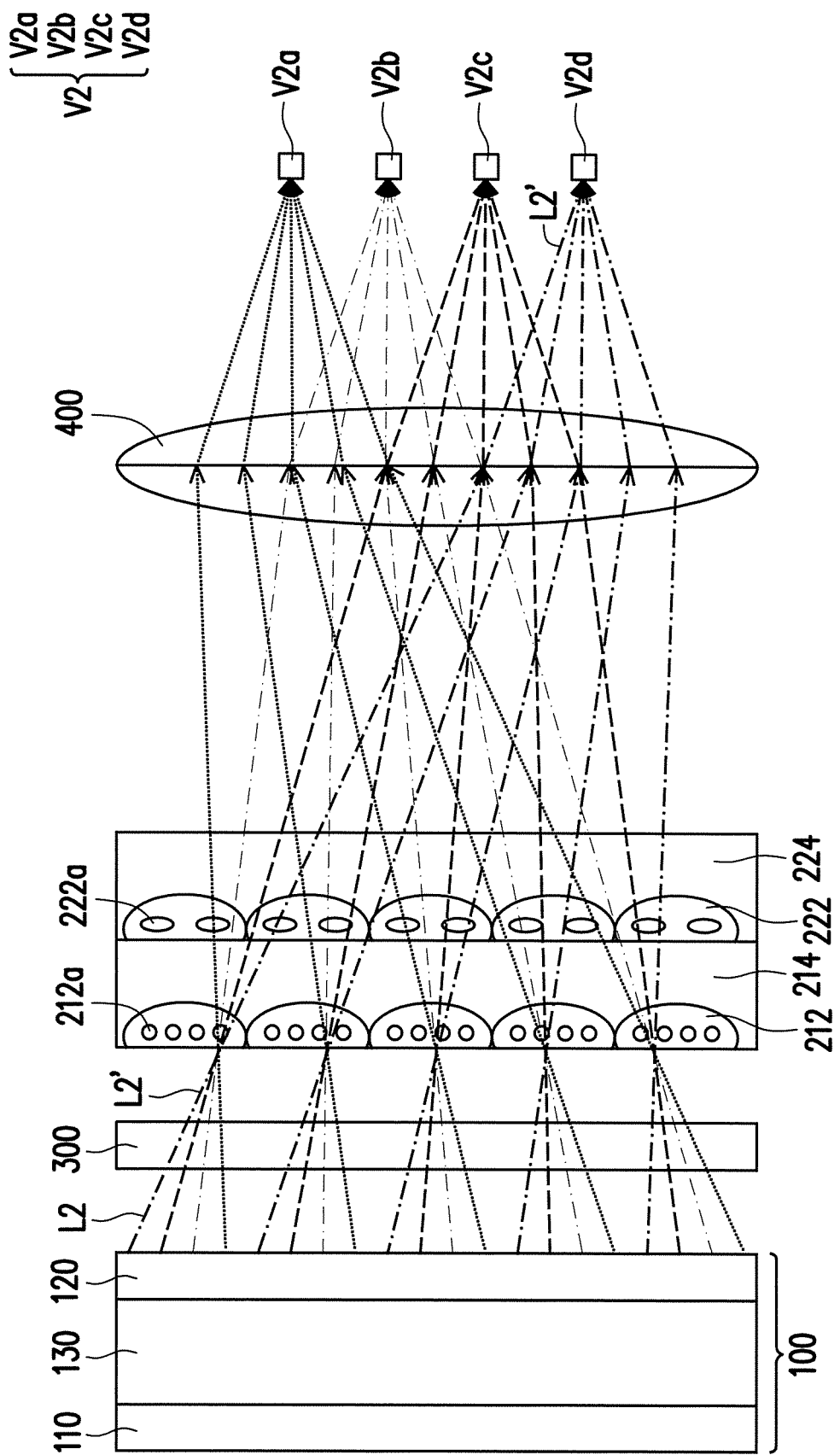
FIG. 6B is a schematic view illustrating the trajectory of light beams of the display panel during a second time period according to yet another embodiment of the present invention.
Figure 6C:
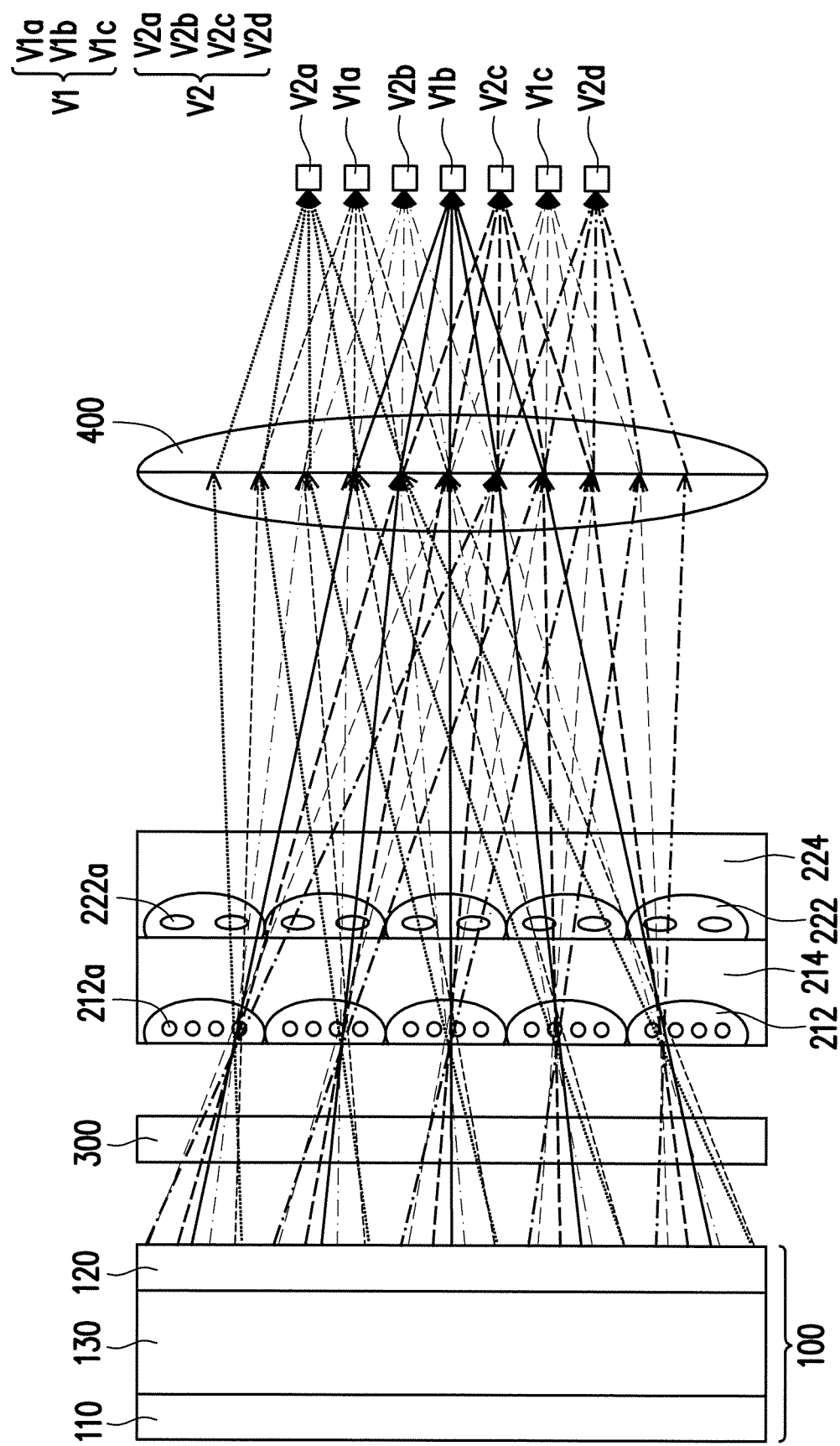
FIG. 6C is a schematic view illustrating the trajectory of light beams of the display panel according to yet another embodiment of the present invention.

FIG. 6A is a schematic view illustrating the trajectory of light beams of a display panel 10 during a first time period according to yet another embodiment of the present invention. FIG. 6B is a schematic view illustrating the trajectory of light beams of the display panel 10 during a second time period according to yet another embodiment of the present invention. FIG. 6C is a schematic view illustrating the trajectory of light beams of the display panel 10 according to yet another embodiment of the present invention. The present embodiment is similar to the embodiment of FIG. 4A to FIG. 4F, so the same elements are denoted by the same reference numerals and the detailed descriptions thereof are omitted herein. The difference between the embodiments of FIG. 6A to FIG. 6C and FIG. 4A to FIG. 4F lies in that in the present embodiment, more view points are generated. As shown in FIG. 6A, the display apparatus 10 generates three first view points V1a, V1b, and V1c during the first time period. On the other hand, as shown in FIG. 6B, the display apparatus 10 generates four second view points V2a, V2b, V2c, and V2d. In other words, in the present embodiment, a sum of the first view point set V1 and the second view point set V2 is 7, as shown in FIG. 6C. That is, in the present embodiment, the display apparatus 10 is able to generate 7 view points. As mentioned above, the relationship among the number N of the view points generated by the display apparatus, the first distance A, and the second distance B is defined by the following equation:

$$B = A \times \left(\frac{N+1}{N-1}\right).$$

In the present embodiment, the second distance B between the display panel 100 and the second lens layer 220 is 4/3 times the first distance A between the display panel 100 and the first lens layer 210. Similar to that of FIG. 4E, in the present embodiment, the first view point V1a is located between the second view points V2a and V2b, the first view point V1b is located between the second view points V2b and V2c, and the first view point V1c is located between the second view points V2c and V2d. In other words, in the present embodiment, the first view points V1a, V1b, V1c and the second view points V2a, V2b, V2c, V2d are arranged alternately.

It should be noted that although in the embodiment of FIG. 6A to FIG. 6C, the first view set V1 and the second view point set V2 are arranged alternately, the present invention is not limited thereto. In other embodiments, the view points of FIG. 6A to FIG. 6C may be similar to embodiment of FIG. 5 and are arranged randomly. Moreover, in the foregoing embodiments, the total view points are exemplified as 5 or 7, but the present invention is not limited thereto. In other embodiments, the display apparatus 10 is also able to generate other number of view points as long as the total view points generated is a positive odd number.

Accordingly, the display apparatus of an embodiment of the present invention utilizes the concept of spatial light splitting and the concept of time light splitting to generate multiple view points on the pupil plane. As a result, high resolution image may be provided to the viewer under a comfortable viewing environment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display apparatus, comprising:
   a display panel;
   a lens assembly, comprising:
      a first lens layer, comprising a plurality of first lenses; and
      a second lens layer, comprising a plurality of second lenses respectively aligned with the first lenses;
   a polarization converting unit located between the display panel and the lens assembly; and
   a third lens layer, wherein the lens assembly is located between the polarization converting unit and the third lens layer, the display apparatus generates N view points, a first view point set generated during a first time period corresponds to k1 significant wave peaks of a first measured wave group, a second view point set generated during a second time period corresponds to k2 significant wave peaks of a second measured wave group, N=k1+k2, and N is a positive odd number.

2. The display apparatus according to claim 1, wherein the first lens layer is located between the display panel and the second lens layer, a first distance A is between the display panel and the first lens layer, a second distance B is between the display panel and the second lens layer, and $$B = A \times \left(\frac{N+1}{N-1}\right),$$

wherein B is about 1.5 times A, and N is more than 1.

3. The display apparatus according to claim 1, wherein the first lens layer is located between the display panel and the second lens layer, a first distance A is between the display panel and the first lens layer, a second distance B is between the display panel and the second lens layer, and $$B = A \times \left(\frac{N+1}{N-1}\right),$$

wherein B is about 4/3 times A, and N is more than 1.

4. The display apparatus according to claim 1, wherein the display panel comprises a plurality of pixel units, at least one of the pixel units has a width $P_d$, a pitch $P_m$ is between two adjacent first lenses, and the width $P_d$ is greater than the pitch $P_m$.

5. The display apparatus according to claim 1, wherein each of the first lenses comprises a plurality of first liquid crystal molecules, each of the second lenses comprises a plurality of second liquid crystal molecules, an orientation of the first liquid crystal molecules is perpendicular to an orientation of the second liquid crystal molecules.

6. The display apparatus according to claim 1, wherein the first lens layer is located between the display panel and the second lens layer, a first distance A is between the display panel and the first lens layer, a second distance B is between the display panel and the second lens layer, and B is about 1.5 times A.

7. The display apparatus according to claim 1, wherein the first lens layer is located between the display panel and the second lens layer, a first distance A is between the display panel and the first lens layer, a second distance B is between the display panel and the second lens layer, and B is about 4/3 times A.

8. A displaying method, comprising:
providing a display apparatus, comprising:
  a display panel;
  a lens assembly, comprising:
    a first lens layer, comprising a plurality of first lenses; and
    a second lens layer, comprising a plurality of second lenses respectively aligned with the first lenses;
  a polarization converting unit located between the display panel and the lens assembly; and
  a third lens layer, wherein the lens assembly is located between the polarization converting unit and the third lens layer;
providing a plurality of first polarized image beams during a first time period through the second lens layer to generate a first view point set, wherein the first view point set comprises a plurality of first view points; and
providing a plurality of second polarized image beams during a second time period through the first lens layer to generate a second view point set, wherein the second view point set comprises a plurality of second view points, and at least one first view point of the first view point set is inserted among the second view points of the second view point set, wherein
the first view points and the second view points are arranged alternately, the first view points respectively correspond to k1 significant wave peaks, the second view points respectively correspond to k2 significant wave peaks, N=k1+k2, and N is a positive odd number.

9. The displaying method according to claim 8, wherein the first lens layer is located between the display panel and the second lens layer, a first distance A is between the display panel and the first lens layer, a second distance B is between the display panel and the second lens layer, the display apparatus generates N view points, and $$B = A \times \left(\frac{N+1}{N-1}\right),$$

wherein B is about 4/3 times A or 1.5 times A, and N is more than 1.

10. The displaying method according to claim 8, wherein the step of providing the first polarized image beams during the first time period through the second lens layer to generate the first view point set comprises:
  providing a plurality of first image beams through the display panel;
  modulating the first image beams into the first polarized image beams when the first image beams pass through the polarization converting unit; and
  refracting and converging the first polarized image beams to form the first view point set when the first polarized image beams pass through the second lens layer; and
the step of providing the second polarized image beams during the second time period through the first lens layer to generate the second view point set comprises:
  proving a plurality of second image beams through the display panel;
  modulating the second image beams into the second polarized image beams when the second image beams pass through the polarization converting unit; and
  refracting and converging the second polarized image beams to form the second view point set when the second polarized image beams pass through the first lens layer.

11. The displaying method according to claim 10, wherein the first lens layer does not refract the first polarized image beams, and the second lens layer does not refract the second polarized image beams.

12. The displaying method according to claim 10, wherein the display panel comprises a plurality of pixel units, at least one of the pixel units has a width $P_d$, a pitch $P_m$ is between two adjacent first lenses, and the width $P_d$ is greater than the pitch $P_m$.

13. The displaying method according to claim 12, wherein each of the first lenses comprises a plurality of first liquid crystal molecules, each of the second lenses comprises a plurality of second liquid crystal molecules, an orientation of the first liquid crystal molecules is perpendicular to an orientation of the second liquid crystal molecules.

* * * * *